United States Patent
Shibata et al.

(10) Patent No.: US 6,780,894 B2
(45) Date of Patent: Aug. 24, 2004

(54) TREATMENT LIQUID FOR CURED UNSATURATED POLYESTER RESIN AND TREATMENT METHOD THEREOF

(75) Inventors: Katsuji Shibata, Ibaraki-ken (JP); Hiroyuki Izawa, Ibaraki-ken (JP); Ayako Matsuo, Tochigi-ken (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 121 days.

(21) Appl. No.: 10/022,342

(22) Filed: Dec. 20, 2001

(65) Prior Publication Data

US 2002/0120019 A1 Aug. 29, 2002

(30) Foreign Application Priority Data

Dec. 22, 2000 (JP) .................................... P2000-390804

(51) Int. Cl.$^7$ ................................................ C08J 11/04
(52) U.S. Cl. .............................................. 521/48; 521/48.5
(58) Field of Search .................................. 521/48, 48.5

(56) References Cited

U.S. PATENT DOCUMENTS

| | | | |
|---|---|---|---|
| 3,317,519 A | | 5/1967 | Lazarus et al. |
| 3,488,298 A | * | 1/1970 | Barkey et al. ............. 562/485 |
| 3,907,868 A | * | 9/1975 | Currie et al. ............... 560/98 |
| 4,044,046 A | | 8/1977 | Kondo et al. |
| 5,420,166 A | * | 5/1995 | Tufts et al. ................ 521/40.5 |
| 5,559,159 A | | 9/1996 | Sublett et al. |
| 5,776,989 A | * | 7/1998 | Kubota et al. ............... 521/48 |
| 5,840,772 A | | 11/1998 | Peters et al. |
| 6,001,888 A | | 12/1999 | Friebe et al. |
| 6,573,304 B1 | * | 6/2003 | Durand et al. ............... 521/48 |
| 2002/0177636 A1 | * | 11/2002 | Kawamura et al. .......... 523/501 |

FOREIGN PATENT DOCUMENTS

| | | |
|---|---|---|
| EP | 0891969 | 1/1999 |
| JP | 5-139715 | 6/1993 |
| JP | 6-87123 | 3/1994 |
| JP | 7-330946 | 12/1995 |
| JP | 8-85736 | 4/1996 |
| JP | 8-113619 | 5/1996 |
| JP | 8-134340 | 5/1996 |
| JP | 8-225635 | 9/1996 |
| JP | 9-221565 | 8/1997 |
| JP | 9-316311 | 12/1997 |

* cited by examiner

Primary Examiner—Katarzyna Wyrozebski
(74) Attorney, Agent, or Firm—Greenblum & Bernstein, P.L.C.

(57) ABSTRACT

The present invention provides a decomposition treatment liquid for a cured unsaturated polyester resin, comprising a phosphoric acid-type compound or salt thereof and an organic solvent as essential components. By using the treatment liquid of the invention, a cured unsaturated polyester resin can be easily decomposed or dissolved.

21 Claims, No Drawings

TREATMENT LIQUID FOR CURED UNSATURATED POLYESTER RESIN AND TREATMENT METHOD THEREOF

BACKGROUND OF THE INVENTION

1. Field of the Invention

The present invention relates to a decomposition treatment liquid for a cured unsaturated polyester resin, a method for treating a cured unsaturated polyester resin by the use of the treatment liquid, and a method for separating a composite material.

2. Description of the Related Art

Cured polyester resins are excellent in thermal resistance, mechanical properties, weather resistance, chemical resistance, water resistance and the like, and therefore, the resins are utilized in various fields.

However, since unsaturated polyester resins are thermosetting resins, they do not melt after molded and further are insoluble in general-purpose solvents, so that it is difficult to reuse them. Moreover, various fillers to be mixed for improving mechanical properties and the like are difficult to dissolve, and hence, these materials cannot be reused.

As inventions aiming at the separation of a filler from a cured resin, a method for thermally decomposing the resin at a temperature of 900° C. or higher is known for separating and recovering silica from a molded material, as disclosed in Japanese Patent Application Laid-Open Nos. 1993-139715 and 1994-87123. Additionally in Japanese Patent Application Laid-Open No. 1995-330946, there is also disclosed a method for recovering the filler by the thermal decomposition of a thermosetting resin.

In these inventions, however, since the resin is thermally decomposed to gasify it, the decomposed product of the resin cannot be reused except for its reuse as energy. Moreover, since a high temperature of 300° C. or higher is usually required for decomposing the resin, there is a possibility that fillers other than silica are degraded to make their reuse impossible. Moreover, for the thermal decomposition at a high temperature exceeding 300° C., there is required a special apparatus for controlling the reaction temperature and pressure. Furthermore, special attention for safety is needed owing to the operation at a high temperature and a high pressure.

As a method for the thermal decomposition of an unsaturated polyester, Japanese Patent Application Laid-Open No. 1996-85736 discloses a method for the thermal decomposition together with a feed source of a hydroxyl group. According to the publication, the temperature necessary for the thermal decomposition is generally in a range of from 370 to 390° C. Moreover, the publication describes "At the thermal decomposition of the resin, the resin is preferably heated at a temperature range of from about 340 to 900° C., particularly about 350 to 450° C.".

However, the thermal decomposition at a high temperature exceeding 300° C. requires a special apparatus for controlling the reaction temperature and pressure. Moreover, special attention for safety is needed owing to the operation at a high temperature and a high pressure.

On the other hand, as a method of the decomposition at a lower temperature as compared with the case of the thermal decomposition, there is a method of chemical decomposition. As a method for chemically decomposing an unsaturated polyester resin, Japanese Patent Application Laid-Open No. 1996-113619 discloses a method of using a base and a hydrophilic solvent. Japanese Patent Application Laid-Open No. 1996-134340 discloses a method of using a base and a monohydric alcohol. Moreover, a method of using a glycol is disclosed in Japanese Patent Application Laid-Open No. 1996-225635 and a method of using a dicarboxylic acid or a diamine is disclosed in Japanese Patent Application Laid-Open No. 1997-221565. Japanese Patent Application Laid-Open No. 1997-316311 discloses a method of using diethanolamine.

However, since these methods employ corrosive chemical substances, special attention toward the human body and the environment is indispensable. Moreover, in the case of using no corrosive chemical substance, the method is not practical because of an extremely slow decomposition rate.

In the case of decomposing or dissolving a cured unsaturated polyester resin for the purpose of reuse the raw materials, it is generally not preferable to decompose the resin thermally.

In general, in the thermal decomposition under an atmosphere containing oxygen, carbon atom and hydrogen atom are oxidized to form carbon dioxide and water, respectively, and therefore, it is difficult to used them as synthetic raw materials of a resin.

Furthermore, in the thermal decomposition under an atmosphere containing no oxygen, hydrogen atom bonded to carbon atom is liable to be eliminated, whereby mainly carbon is formed. Therefore, it is difficult to reuse it as a raw material of a resin.

Further, in the case of separating the decomposition product of a cured unsaturated polyester resin from a filler for the purpose of reusing each of them, it is difficult to reuse them because melting, oxidization, or a change of crystalline structure of the resin occurs and thereby, changes of strength and form thereof are resulted in when the filler is excessively heated.

Moreover, the methods of using corrosive chemical substances are not preferable in view of harmfulness to the human body and necessity of special consideration for safety of the apparatus.

Furthermore, in view of the efficiency at dissolution, higher decomposition rate or dissolution rate of the cured resin is more preferable.

SUMMARY OF THE INVENTION

An object of the invention is to decompose or dissolve efficiently a cured unsaturated polyester resin which is used for small crafts, automobile parts, railroad vehicle parts, furniture, bathtubs, electrical appliance, water-reservoir tanks, and the like.

Moreover, another object of the present invention is to separate efficiently a filler from decomposed components of a cured unsaturated polyester resin.

The present invention includes a decomposition treatment liquid for cured unsaturated polyester resins, comprising a phosphoric acid-type compound or salt thereof, and an organic solvent.

The salt of phosphoric acid-type compound preferably includes potassium phosphate, more preferably potassium phosphate hydrate.

The treatment liquid may contain an alkali metal ion.

The treatment liquid may contain an alcohol-based solvent or an organic solvent having a boiling point of 170° C. or higher. Preferably, the treatment liquid is an alcohol-based solvent having a boiling point of 170° C. or higher.

The present invention also includes a method for treating a cured unsaturated polyester resin comprising a step of decomposing or dissolving the cured unsaturated polyester resin using the above treatment liquid.

At the treatment, the temperature of the treatment liquid may be 250° C. or lower. Moreover, the resin may be treated under atmospheric pressure.

The present invention also includes a method for separating a composite material containing a filler and a cured unsaturated polyester resin wherein the composite material is separated into the filler and a cured resin powder or a solution of decomposed product of the cured resin by treating the cured resin with the above treatment liquid.

According to the treatment liquid of the present invention, a cured unsaturated polyester resin can be easily decomposed or dissolved.

Moreover, according to the invention, a cured unsaturated polyester resin can be converted to a reusable resin material by decomposition or dissolution thereof.

Furthermore, according to the present invention, by decomposing or dissolving a cured unsaturated polyester resin using a specific treatment liquid, a composite material containing a filler and a cured unsaturated polyester resin can be separated into the filler and the resin, each of which can be easily reused.

Namely, the present invention is effective for reuse of a molding which comprises using a cured unsaturated polyester resin.

The present disclosure relates to subject matter contained in Japanese Patent Application No. 2000-390804, filed on Dec. 22, 2000, the disclosure of which is expressly incorporated herein by reference in its entirety.

DETAILED DESCRIPTION OF THE INVENTION

The following will explain the present invention in detail.

The cured unsaturated polyester resin, which is a target of the treatment of the present invention, is not particularly limited and the treating method of the present invention can be applied to any cured unsaturated polyester resin commonly known. That is, the treatment liquid of the present invention can be applied to a cured molding comprising an unsaturated polyester and a polymerizable monomer as essential components.

The following will illustrate the examples of preparing the cured unsaturated polyester resin which is a target of the treatment of the invention.

The unsaturated polyester is obtained, for example, by reacting a polybasic acid component including an $\alpha,\beta$-unsaturated polybasic acid or anhydride thereof as an essential component with a polyhydric alcohol.

Examples of the $\alpha,\beta$-unsaturated polybasic acid or anhydride thereof which is a synthetic raw material of the unsaturated polyester includes $\alpha,\beta$-unsaturated dibasic acids or anhydrides thereof, more specifically maleic acid, fumaric acid, itaconic acid, citraconic acid and maleic anhydride. These may be used singly or as a combination of two or more of them.

For regulating the concentration of an unsaturated group and imparting characteristics such as flexibility, thermal resistance, and the like, the above polybasic acid component may contain a saturated polybasic acid or anhydride thereof other than the $\alpha,\beta$-unsaturated polybasic acid or anhydride thereof.

The ratio of the saturated polybasic acid among the whole polybasic acid component is optionally controlled depending on the purpose. However, when the ratio of the $\alpha,\beta$-unsaturated polybasic acid or anhydride thereof among the whole polybasic acid component becomes smaller, the strength of the resulting molded product tends to decrease gradually. For example, for preparing a hard molded product, the content of the $\alpha,\beta$-unsaturated polybasic acid or anhydride thereof in the polybasic acid component is preferably 40 mol % or more, more preferably 45 to 80 mol %, particularly preferably 50 to 70 mol %.

Examples of the above saturated polybasic acid or anhydride thereof include phthalic acid, phthalic anhydride, isophthalic acid, terephthalic acid, tetrahydrophthalic acid, tetrahydrophthalic anhydride, 3,6-endo-methylenetetrahydrophthalic anhydride, hexahydrophthalic acid, hexahydrophthalic anhydride, glutaric acid, adipic acid, sebacic acid, trimellitic acid, trimellitic anhydride, pyromellitic acid, dimer acid, succinic acid, azelaic acid and rosin-maleic acid adduct. These may be used singly or as a combination of two or more of them.

Examples of the polyhydric alcohol which is another synthetic raw material of the unsaturated polyester include dihydric alcohols such as ethylene glycol, diethylene glycol, propylene glycol, dipropylene glycol, 1,3-butanediol, 1,6-hexanediol, neopenthyl glycol, 1,4-cyclohexanediol, and hydrogenated bisphenol A; trihydric alcohols such as glycerin and trimethylolpropane; tetrahydric alcohols such as pentaerythritol; and the like. These may be used singly or as a combination of two or more of them.

With regard to the polybasic acid component and the polyhydric alcohol, the polyhydric alcohol is used in an equivalent ratio of preferably 1 to 1.3, more preferably 1.03 to 1.05, when the polybasic acid component is 1. When the ratio of the polyhydric alcohol decreases, the molecular weight of the resulting unsaturated polyester tends to decrease. When the ratio increases, acid value decreases, and thereby, increase of viscosity tends to proceed slowly in the case that a thickening agent is used.

An unsaturated polyester can be synthesized by a method hitherto known. For example, the polybasic acid component and the polyhydric alcohol were subjected to condensation reaction under removal of water formed at the time when both components were reacted. The removal of the water was effected by spontaneous distillation by passing an inert gas or distillation under reduced pressure. In order to accelerate the distillation of the water, a solvent such as toluene, xylene, or the like may be added to the system as an azeotropic component. Progress of the reaction can be detected generally by measurement of the amount of distillate formed during the reaction, quantitative determination of terminal groups, measurement of viscosity of the reaction system, or the like.

The temperature of the reaction is preferably 150° C. or higher. Moreover, in order to prevent a side reaction by oxidation, the reaction is preferably carried out under passing an inert gas, such as nitrogen or carbon dioxide, through the system.

As the reaction apparatus, an apparatus made of glass, stainless steel, or the like is selected, and it is preferable to use an apparatus fitted with a stirring apparatus, a fractional distillation apparatus for preventing the distillation of the alcohol component by azeotropy of water and the alcoholic component, a heating apparatus for raising the temperature of the reaction system, a temperature-controlling apparatus for the heating apparatus, an apparatus for introducing an inert gas such as nitrogen, and the like.

The number average molecular weight of the unsaturated polyester is preferably from 1000 to 4500. When the molecular weight is smaller than 1000, the viscosity does not increase even if an appropriate amount of a thickening agent is added, so that the resulting resin composition may be soft and disadvantageous in the workability. When the molecular weight is larger than 4500, the viscosity is high, an insufficient impregnation is apt to occur in the case of impregnation of glass fiber or the like, and the surface glossiness after molding tends to decrease.

Examples of the polymerizable monomer for use in the cured unsaturated polyester resin include styrene derivatives such as styrene, chlorostyrene, divinylbenzene, tert-butylstyrene, and bromostyrene; alkyl esters of methacrylic acid or acrylic acid, such as methyl methacrylate, ethyl methacrylate, ethyl acrylate, and butyl acrylate; hydroxyalkyl esters of methacrylic acid or acrylic acid, such as β-hydroxyethyl methacrylate and β-hydroxyethyl acrylate; diallyl phthalate, acrylamide, phenylmaleimide, and the like. In addition, polyfunctional methacrylate or acrylate esters such as ethylene glycol dimethacrylate, neopentyl glycol dimethacrylate and trimethylolpropane trimethacrylate may be used.

An unsaturated polyester resin composition may be prepared by mixing the unsaturated polyester and the polymerizable monomer and adding a curing agent, a polymerization inhibitor, a shrinkage-lowering agent, a thickening agent, and the like, if necessary. The mixing ratio of the unsaturated polyester resin to the polymerizable monomer can be selected depending on the form of a product to be applied, workability at the manufacturing process, and the like. For example, in the case of applying the composition to a fabric material in a sheet form, it is preferable to use 25 to 80 parts by weight of the unsaturated polyester resin and 75 to 20 parts by weight of the polymerizable monomer, and it is more preferable to use 40 to 65 parts by weight of the unsaturated polyester resin and 60 to 35 parts by weight of the polymerizable monomer, the total amount of the unsaturated polyester resin and the polymerizable polymer being 100 parts by weight. When the amount of the unsaturated polyester resin is less than 25 parts by weight, the viscosity of the resin composition is too low to apply it in a sheet form, and the composition is difficult to mix with other components owing to sedimentation. Furthermore, when a fiber-reinforced molding material resulted from the composition is molded, shrinkage at curing is large and thus, breaking, cracking, or the like may occur at molded products. When the amount of the unsaturated polyester resin exceeds 80 parts by weight, there is a possibility that the composition is difficult to apply owing to the high viscosity or that the composition is difficult to mix with other components.

Examples of the curing agent include ketone peroxides, peroxydicarbonates, hydroperoxides, diacyl peroxides, peroxy ketals, dialkyl peroxides, peroxy esters, alkyl peresters, and the like. The amount of the curing agent affects not only molding cycle but also shelf life of the material, color heterogeneity, and the like, and therefore, is suitably determined depending on the required properties. In view of the shelf life of the material and molding cycle, the amount of the curing agent is preferably from 0.5 to 5% by weight, more preferably 1 to 3% by weight, relative to the total amount of the above unsaturated polyester resin and the polymerizable monomer.

Examples of the polymerization inhibitor include p-benzoquinone, naphthoquinone, toluquinone, hydroquinone, mono-t-butylhydroquinone, dibutylhydroxytoluene, and the like. The polymerization inhibitor is preferably used in an amount of 0.5% by weight or less relative to the total amount of the above unsaturated polyester resin and the polymerizable monomer. In the resin composition mixed with a curing agent, it is preferable to incorporate the inhibitor in an amount of 0.05% by weight or more, for imparting storage stability.

As the shrinkage-lowering agent, a thermoplastic resin such as polymethyl methacrylate, polystyrene, polycaprolactone, polyvinyl acetate, polyethylene, or butadiene rubber may be contained, for example. The amount to be used is determined in consideration of the shrinkage, surface smoothness, and surface gloss of a molded product, and is not particularly limited. In the case of preparing a low-shrinkage hard molded product, it is preferable to use the shrinkage-lowering agent in an amount ranging from 20 to 50% by weight relative to the total amount of the above unsaturated polyester resin and the polymerizable monomer.

As the thickening agent, magnesium oxide, magnesium hydroxide, potassium oxide, potassium hydroxide, or the like may be used, for example. In general, magnesium oxide is used. The amount of the thickening agent is determined depending on the workability of the molding material. The amount is preferably from 0.5 to 5% by weight, more preferably from 0.7 to 2% by weight relative to the total amount of the above unsaturated polyester resin and the polymerizable monomer. When the amount of the thickening agent is too small, there occurs a case that the viscosity of the resin composition does not increase, and thus no effect is obtained. When the amount is too large, there is a possibility that the viscosity increases too much to control.

The above unsaturated polyester resin composition may be further incorporated with a releasing agent, a stabilizer, a colorant, or the like, if necessary.

Furthermore, the unsaturated polyester resin composition may be mixed with an inorganic filler as shown below and then molded. As the inorganic filler, those generally used for resins may be utilized. Examples of the inorganic filler include metals and oxides, hydroxides, halides, and nitrides of metals, non-metallic crystals, and the like. More specific examples include boron, aluminum, iron, silicon, titanium, chromium, cobalt, nickel, zinc, palladium, silver, tin, tungsten, platinum, gold, lead, alumina, zirconia, magnesia, silicon carbide, silicon nitride, boron nitride, mica, silica, clay, glass, carbon, calcium carbonate, aluminum hydroxide, magnesium hydroxide, calcium silicate, and the like. These inorganic fillers may be used singly, or as a fused one or mixture of each component. In the case that the inorganic filler is an inorganic filler having a low solubility in the treatment liquid, such as glass, calcium carbonate, or the like, the inorganic filler can be easily separated and recovered to reuse. Moreover, the form of the inorganic filler may be powder, fiber, bead, foil, film, wire, circuit, or the like. The fiber may be mat-shape one or woven one such as a cloth. The ratio of the inorganic filler contained in a cured resin is not particularly limited, but is, in general, in the range of 5 to 90% by weight.

Furthermore, the unsaturated polyester resin composition may be mixed with a natural organic substance such as wood or an artificial organic substance such as a plastic piece as an organic filler, and then the mixture may be molded. In the case that the solubility of the organic filler in the treatment liquid is low, the organic filler can be easily separated and recovered.

The unsaturated polyester resin which is a target of the present invention can be produced by a method hitherto known. Examples of the known method include a method wherein the polybasic acid component and the polyhydric alcohol were subjected to condensation reaction which proceeds under the removal of the water resulted from the condensation. The removal of the water was preferably effected by spontaneous distillation by passing an inert gas or distillation under reduced pressure. In order to accelerate distillation of the water, a solvent such as toluene or xylene may be added to the system as an azeotropic component. Progress of the reaction can be detected generally by measurement of the amount of eluate formed during the reaction, quantitative determination of terminal groups, measurement of viscosity of the reaction system, or the like. The curing of the unsaturated polyester resin may be carried out at any temperature as far as the curing proceeds, but the curing is generally effected at a temperature ranging from room temperature to 250° C. Moreover, the curing may be carried out under elevated pressure, or atmospheric pressure or reduced pressure. The cured resin is not necessarily hardened perfectly, and may be a semi-hardened one which does not flow at roam temperature. As one example thereof, a molding material using an unsaturated polyester may be mentioned.

At the treatment of the cured unsaturated polyester resin with the treatment liquid, the cured resin may be treated as such a size or after crushing. The size of crushed resin is not particularly limited and any sized resin may be treated. Namely, it is not necessary to crush into particular small pieces, and it is sufficient to adjust the resin to the size which can be treated in a treating apparatus. Particularly, in the case of separating and recovering a filler, it is preferable to adjust the size of the crushed pieces according to the efficiency at separation and recovery of the filler and the operability at the reuse of the recovered filler. For example, in the case of recovering a filler, such as glass fiber, which becomes difficult to reuse when crushed into fine pieces, it is preferable to adjust the crushed pieces to a size of 10 mm or more. In consideration of the scale of the apparatus, treating process, and treating time, the maximum size of the cured unsaturated polyester resin or crushed pieces thereof is preferably in the range of 10 mm to 1.5 m. When the size is smaller than the range, the crushing process tends to take a longer period of time, while the treating time becomes longer when the size is larger than the range.

The treatment liquid for decomposing or dissolving the cured unsaturated polyester resin which is a target of the present invention, comprises a phosphoric acid-type compound or salt thereof, and an organic solvent.

Moreover, the treatment liquid may contain both a phosphoric acid-type compound and salt thereof.

Examples of the phosphoric acid-type compound include phosphoric acid, hypophosphoric acid, phosphorous acid, hypophosphorous acid, pyrophosphoric acid, trimetaphosphoric acid, tetrametaphosphoric acid, and pyrophosphorous acid.

Examples of the salt of the phosphoric acid-type compound comprise anions of the above phosphoric acid-type compounds and cations.

Examples of the cations include ions of lithium, sodium, potassium, rubidium, cesium, beryllium, magnesium, calcium, strontium, barium, titanium, zirconium, vanadium, chromium, manganese, iron, cobalt, nickel, copper, silver, palladium, zinc, aluminum, gallium, tin and ammonium.

These salts may be any of primary salts having one metal and two hydrogen atoms, secondary salts having two metal and one hydrogen atom, and tertiary salts having three metals, and may be any of acidic salts, alkaline salts, and neutral salts. These compounds may be used singly or as a mixture of several kinds of them. Moreover, any compound other than these compounds may be used in combination, and contamination of impurities may cause no problem.

Among these compounds, in view of the solubility in a solvent, preferred is a salt of an alkali metal with a phosphoric acid-type compound. In the case that a water-soluble solvent is used, a hydrate thereof is further preferred.

As the organic solvent for use in the present invention, preferred are amide-type, alcohol-based, ketone-type, ether-type, ester-type solvents. These may be used singly or as a mixture of several kinds of them. Moreover, in combination with these solvents, inorganic solvents may be used, and contamination of impurities in the solvents may cause no problem.

Examples of the amide-type solvents include formamide, N-methylformamide, N,N-dimethylformamide, N,N-diethylformamide, acetamide, N-methylacetamide, N,N-dimethylacetamide, N,N,N', N'-tetramethylurea, 2-pyrrolidone, N-methyl-2-pyrrolidone, caprolactam and carbamate esters.

Examples of the alcohol-based solvents include methanol, ethanol, 1-propanol, 2-propanol, 1-butanol, 2-butanol, iso-butanol, tert-butanol, 1-pentanol, 2-pentanol, 3-pentanol, 2-methyl-1-butanol, iso-pentyl alcohol, tert-pentyl alcohol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, cyclohexanol, 1-methylcyclohexanol, 2-methylcyclohexanol, 3-methylcyclohexanol, 4-methylcyclohexanol, 1,2-propanediol, 1,3-propanediol, 1,2-butanediol, 1,3-butanediol, 1,4-butanediol, 2,3-butanediol, 1,5-pentanediol, glycerin, dipropylene glycol, ethylene glycol, ethylene glycol monomethyl ether, ethylene glycol monoethyl ether, ethylene glycol monopropyl ether, ethylene glycol monobutyl ether, diethylene glycol, diethylene glycol monomethyl ether, diethylene glycol monoethyl ether, diethylene glycol monopropyl ether, diethylene glycol monobutyl ether, triethylene glycol, triethylene glycol monomethyl ether, triethylene glycol monoethyl ether, tetraethylene glycol, further, polyethylene glycols such as polyethylene glycol #200, polyethylene glycol #300, and polyethylene glycol #400 (all of them are trade names, manufactured by Kanto Kagaku K.K.). In the case of using a polyethylene glycol, it is preferable that the average molecular weight of the polyethylene glycol is 500 or less in view of the solubility.

Examples of the ketone-type solvents include acetone, methyl ethyl ketone, 2-pentanone, 3-pentanone, 2-hexanone, methyl isobutyl ketone, 2-heptanone, 4-heptanone, diisobutyl ketone, cyclohexanone, methylcyclohexanone, phorone and isophorone.

Examples of the ether-type solvents include dipropyl ether, diisopropyl ether, dibutyl ether, dihexyl ether, anisole, phenethole, dioxane, tetrahydrofuran, acetal, ethylene glycol dimethyl ether, ethylene glycol diethyl ether, diethylene glycol dimethyl ether and diethylene glycol diethyl ether.

Examples of inorganic solvents include water, liquid ammonia, and liquid carbon dioxide.

Among these solvents, an alcohol-based solvent is preferable since the solvent easily dissolves a phosphoric acid-type compound or salt thereof. Furthermore, in the case of treating under normal pressure or reduced pressure, the boiling point of the organic solvent is preferably 170° C. or higher.

In the treatment liquid for use in the present invention, a phosphoric acid-type compound or salt thereof is preferably controlled to any concentration of 0.001 to 80% by weight relative to the organic solvent. When the concentration is less than 0.001% by weight, the decomposition rate of the cured resin tends to decrease, while, when the concentration is higher than 80% by weight, the preparation of the treatment liquid tends to be difficult. The concentration of the phosphoric acid-type compound or salt thereof is particularly preferably from 0.1 to 20% by weight. Moreover, all the amount of the phosphoric acid-type compound or salt thereof is not necessarily dissolved in the solvent. Even when the liquid is a saturated solution in which all the phosphoric acid-type compound or salt thereof is not entirely dissolved, the solute is in an equilibrium state and therefore, the phosphoric acid-type compound or salt thereof can be effectively compensated in the case that it is deactivated.

The treatment liquid may be incorporated with a surfactant.

The treatment liquid may be prepared at any temperature, but in the case of preparing it at normal pressure, the temperature is preferably not lower than the freezing point of the solvent to be used and not higher than the boiling point thereof from the viewpoint of the efficiency of operation and the operability of the liquid. The liquid may be prepared in an atmosphere of air or an inert gas such as nitrogen, argon or carbon dioxide, and may be prepared under normal pressure, reduced pressure, or elevated pressure.

The conditions for treating the cured resin with the treatment liquid is not particularly limited as far as the treatment liquid is in a liquid state. Preferably, in order to control the treating rate, the treatment liquid is used at any temperature which is not lower than the freezing point of the solvent and not higher than the boiling point thereof. Moreover, for preventing the deterioration in the quality of the recovered materials by thermal decomposition of the resin or decrease of the strength of the filler, the treatment is carried out at a temperature of preferably 250° C. or lower, more preferably 200° C. or lower.

The treatment is carried out by dipping the unsaturated polyester into the treatment liquid. For accelerating the treating rate, vibration may be applied by ultrasonication. Alternatively, the treatment liquid may be sprayed with a spray or the like or under high pressure to the polyester without dipping it in the liquid.

The treatment liquid may be used or stored in an atmosphere of air or an inert gas such as nitrogen, argon or carbon dioxide, and may be used or stored under normal pressure, reduced pressure, or elevated pressure. Owing to the excellence in safety and simpleness of operation, it is preferable to use and store the treatment liquid at normal pressure. In the present invention, the treatment of decomposing or dissolving the cured unsaturated polyester resin can be carried out in an air at atmospheric pressure. Namely, an apparatus for achieving a specific gas atmosphere and a specific pressure is not necessarily required.

The resin component resulting from the decomposition or dissolution of the unsaturated polyester according to the present invention can be separated by a common method and can be reused. For example, the resin component obtained by separation of the solvent by distillation after separating impurities by precipitation or the like can be reused as a resin raw material. Moreover, in the case of separating or recovering a solid filler such as a metal or glass, the filler can be recovered by filtration, decantation, or the like after decomposing or dissolving the resin component with the treatment liquid.

The following will explain the present invention with reference to Examples.

EXPERIMENTAL EXAMPLES 1 TO 23 AND REFERENCE EXAMPLES 1 TO 6

[Preparation of Cured Unsaturated Polyester]

Into a 2-liter four-necked flask fitted with a thermometer, a stirrer, and a rectification tube were placed 578 g of propylene glycol, 318 g of diethylene glycol, 444 g of phthalic anhydride, and 686 g of maleic anhydride. The whole was heated to 210° C. over a period of 4 hours in a stream of nitrogen gas, allowed to react at that temperature for 5 hours, and cooled to 160° C. when the acid value reached 8. Then, 784 g of maleic anhydride was added thereto and the whole was heated to 215° C. over a period of 4 hours.

The reaction was continued at that temperature for 6 hours to obtain an unsaturated polyester resin having an acid value of 29.

An unsaturated polyester resin composition was obtained by dissolving 60 parts by weight of the resulting unsaturated polyester resin into 40 parts by weight of styrene monomer in which 0.02 part by weight of hydroquinone was dissolved.

Furthermore, the unsaturated polyester resin composition was cured by heating at 170° C. for 1 hour, and the cured product was cut into pieces of 10 mm×30 mm×3 mm, which were used as test pieces of the cured unsaturated polyester resin.

[Preparation of Treatment Liquid]

As shown in Tables 1 and 2, each of various phosphoric acid-type compounds, salts thereof, or substitutes and each solvent were weighed into a test tube and the whole was gently stirred to obtain a treatment liquid.

[Treatment of Cured Resin with Treatment Liquid]

The test tube in which the treatment liquid was placed was heated to the temperature range of 180 to 220° C. by means of an oil bath. After the measurement of weight of the above test pieces, the test pieces were dipped into the treatment liquid and, after 4 hours, they were taken out and the weight was again measured. The weight change before and after the treatment was divided by total weight of the test pieces to calculate the solubility of the cured resin.

Tables 1 and 2 show the result of Examples 1 to 23 and Reference Examples 1 to 6.

TABLE 1

| Example | Phosporic Acid Salt thereof | Solvent | Concentration (mol/1000 g - solvent) | Temperature (° C.) | Time (h) | Solubility (%) | Corrosiveness |
|---|---|---|---|---|---|---|---|
| Example 1 | P | A | 1.00 | 190 | 4.0 | 1.1 | no |
| Example 2 | Q | A | 1.00 | 190 | 4.0 | 1.8 | no |
| Example 3 | R | A | 0.33 | 190 | 4.0 | 13.3 | no |
| Example 4 | S | A | 0.17 | 190 | 4.0 | 16.0 | no |
| Example 5 | S | A | 0.33 | 190 | 4.0 | 31.6 | no |
| Example 6 | S | A | 0.50 | 190 | 4.0 | 29.9 | no |
| Example 7 | S | A | 0.67 | 190 | 4.0 | 19.1 | no |
| Example 8 | S | A | 0.83 | 190 | 4.0 | 13.7 | no |
| Example 9 | S | A | 1.00 | 190 | 4.0 | 12.8 | no |
| Example 10 | S | A | 0.33 | 180 | 4.0 | 16.7 | no |
| Example 11 | S | B | 0.33 | 180 | 4.0 | 5.0 | no |
| Example 12 | S | B | 0.33 | 190 | 4.0 | 18.8 | no |
| Example 13 | S | B | 0.33 | 200 | 4.0 | 20.8 | no |
| Example 14 | S | B | 0.33 | 210 | 4.0 | 49.1 | no |
| Example 15 | S | C | 0.33 | 190 | 4.0 | 12.2 | no |
| Example 16 | S | C | 0.33 | 200 | 4.0 | 24.8 | no |
| Example 17 | S | C | 0.33 | 210 | 4.0 | 35.1 | no |
| Example 18 | S | C | 0.33 | 220 | 4.0 | 19.5 | no |
| Example 19 | S | D | 0.33 | 190 | 4.0 | 14.1 | no |
| Example 20 | S | E | 0.33 | 200 | 4.0 | 16.8 | no |
| Example 21 | S | F | 0.33 | 200 | 4.0 | 12.9 | no |
| Example 22 | S | G | 0.33 | 200 | 4.0 | 10.5 | no |
| Example 23 | S | H | 0.33 | 200 | 4.0 | 12.1 | no |

TABLE 2

| Reference | Phosphoric acid Salt thereof or Substitute | Solvent | Concentration (mol/1000 g - solvent) | Temperature (° C.) | Time (h) | Solubility (%) | Corrosiveness |
|---|---|---|---|---|---|---|---|
| Reference Example 1 | S | I | 0.33 | 100 | 4.0 | 0.0 | no |
| Reference Example 2 | none | A | 1.00 | 190 | 4.0 | 0.0 | no |
| Reference Example 3 | potassium hydroxide | A | 1.00 | 190 | 4.0 | 14.8 | yes |
| Reference Example 4 | potassium chloride | A | 1.00 | 190 | 4.0 | 0.0 | no |
| Reference Example 5 | sodium acetate | A | 1.00 | 190 | 4.0 | 0.2 | no |
| Reference Example 6 | lithium methoxide | A | 1.00 | 190 | 4.0 | 38.0 | yes |

In the tables, the symbols of phosphoric acid-type compounds and salts thereof and the symbols of solvents mean as follows:
P: phosphoric acid
Q: phosphonic acid
R: tripotassium phosphate
S: tripotassium phosphate hydrate
A: diethylene glycol monomethyl ether TABLE 2-continued

| Reference | Phosphoric acid Salt thereof or Substitute | Solvent | Concentration (mol/1000 g - solvent) | Temperature (° C.) | Time (h) | Solubility (%) | Corrosiveness |
|---|---|---|---|---|---|---|---|

B: benzyl alcohol
C: ethylene glycol
D: diethylene glycol monoethyl ether
E: diethylene glycol
F: triethylene glycol
G: tetraethylene glycol
H: polyethylene glycol #200 (trade name, manufactured by Kanto Kagaku K.K.)
I: water As shown in Examples 1 to 23, in the case of using organic solvent solutions of phosphoric acids-type compounds or salts thereof as treatment liquids, all the solutions dissolve cured unsaturated polyester resins though some difference was observed owing to the kind of solvents. In particular, the solubility is high in Examples 5, 6, 14, and 17.

Moreover, tripotassium phosphate mainly used in the examples is also utilized as a food additive, and thus, it is not necessary to worry about special adverse effects on the human body.

In Reference Example 1 wherein water and a salt of a phosphoric acid-type compound were used, the solubility is found to be 0%. In Reference Example 2 wherein the resin was treated with a solvent alone, the solubility was also 0%.

In Reference Example 4 wherein an alkali metal salt, potassium chloride or sodium acetate was used, the solubility is 1% or less.

Moreover, Reference Examples 3 and 6 wherein corrosive alkalis, i.e., potassium hydroxide and lithium methoxide were used, the solubility were found to be high, the values being 14.8% and 38.0%, respectively. However, these alkalis are corrosive and thus remarkably harmful to the human body.

EXAMPLE 24

To the above unsaturated polyester resin composition was further added calcium carbonate, and the whole was thoroughly mixed. Then, the mixture was applied onto glass fiber and was cured by heating at 170° C. for 1 hour to prepare a composite material which was constituted by 40% by weight of the cured unsaturated polyester resin, 40% by weight of calcium carbonate, and 20% by weight of glass fiber. This material was shaped into test pieces of 10 mm×30 mm×3 mm.

Using tripotassium phosphate hydrate as a catalyst and diethylene glycol monomethyl ether as a solvent, these compounds were weighed into a test tube so that the catalyst concentration became 0.33 mol/1000 g-solvent, and the whole was gently stirred to obtain a treatment liquid.

The test tube in which the treatment liquid was placed was heated at about 190° C. using an oil bath, and the test pieces were dipped into the treating solution. After 18 hours, the test pieces were taken out.

The recovery of the glass fiber was calculated from the amount of the glass fiber recovered from the test pieces taken out. Moreover, the treatment liquid was mixed with an equal amount of distilled water, and precipitate was collected by filtration from the solution. The precipitate was washed with distilled water to recover calcium carbonate, and recovery of the calcium carbonate was calculated.

Next, solvent was removed by distillation from the filtrate, and the remaining resin component was washed with distilled water. With regard to the solubility of the resin in the composite material, the weight of the cured resin before treatment was calculated based on the resin fraction. The weight change of the cured resin was determined from the weight change between the weight of the cured resin before treatment and the resin weight after treatment.

As a result, the solubility of the resin in the composite material was 98%, the recovery of glass fiber was 96%, and the recovery of calcium carbonate was 85%.

EXAMPLE 25

Dissolution treatment was carried out under the same conditions as in Example 24 with the exception that the solvent in Example 24 was replaced by benzyl alcohol which was an alcohol-based solvent.

As a result, the solubility of the resin in the composite material was 95%, the recovery of glass fiber was 90%, and recovery of calcium carbonate was 78%.

EXAMPLE 26

Dissolution treatment was carried out under the same conditions as in Example 24 with the exception that the treating temperature in Example 24 was changed to 210° C.

As a result, the solubility of the resin in the composite material was 99%, the recovery of glass fiber was 98%, and the recovery of calcium carbonate was 93%.

EXAMPLE 27

Dissolution treatment was carried out under the same conditions as in Example 24 with the exception that the treating time in Example 24 was changed to 14 hours.

As a result, the solubility of the resin in the composite material was 99%, the recovery of glass fiber was 97%, and the recovery of calcium carbonate was 92%.

Reference Example 7

Dissolution treatment was carried out under the same conditions as in Example 24 with the exception that the catalyst in Example 24 was not used.

As a result, the composite material did not dissolve in the treatment liquid, and the solubility of the resin in the composite material was 0%, the recovery of glass fiber was 0%, and the recovery of calcium carbonate was 0%.

Reference Example 8

Dissolution treatment was carried out under the same conditions as in Example 24 with the exception that the catalyst in Example 24 was changed to potassium hydroxide which is an alkali metal compound.

As a result, the solubility of the resin in the composite material was 90%, the recovery of glass fiber was 54%, and the recovery of calcium carbonate was 55%.

Examples 24 to 27 are compared with Reference Examples 7 and 8.

In the case of treating with an organic solvent alone shown in Reference Example 7, no dissolution of the composite material was observed.

Moreover, as shown in Reference Example 8, in the case of treating with an alkali metal compound, potassium hydroxide and an organic solvent, a high solubility was observed. However, because these solutions were corrosive, the deterioration of the glass fiber occurred, and thus, the recovery thereof was low.

On the other hand, in the case of using organic solvent solutions of phosphoric acid-type compounds or salts thereof as treatment liquids shown in Examples 24 to 27, the cured unsaturated polyester resin is dissolved.

Particularly in Example 26, all the amount of the cured polyester resin in the composite material is dissolved and the recovery of glass fiber and the recovery of calcium carbonate are high. Moreover, tripotassium phosphate hydrate mainly used in the examples is a food additive. The glass fiber and calcium carbonate thus recovered can be reused as such. Furthermore, the recovered resin component may be utilized as such as a part of resin composition or may be reused after separation into each component by distillation or the like.

It should be understood that the foregoing relates to only a preferred embodiment of the invention, and it is intended to cover all changes and modifications of the examples of the invention herein chosen for the purpose of the disclosure, which do not constitute departures form the sprit and scope of the invention.

What is claimed is:

1. A decomposition treatment liquid for a cured unsaturated polyester resin, comprising a compound having a phosphoric acid structure or salt thereof and an organic solvent, wherein the compound having a phosphoric acid structure is present at an amount between 0.00 1 to 80% by weight relative to the organic solvent.

2. A decomposition treatment liquid for the cured unsaturated polyester resin, comprising a salt of a compound having a phosphoric acid structure and an organic solvent, wherein the compound having a phosphoric acid structure is present at an amount between 0.001 to 80% by weight relative to the organic solvent.

3. The decomposition treatment liquid for the cured unsaturated polyester resin according to claim 2, wherein the salt of a compound having a phosphoric acid structure has an alkali metal ion.

4. The decomposition treatment liquid for the cured unsaturated polyester resin according to claim 2, wherein the salt of a compound having a phosphoric acid structure includes a potassium phosphate.

5. The decomposition treatment liquid for the cured unsaturated polyester resin according to claim 2, wherein the salt of a compound having a phosphoric acid structure includes a potassium phosphate hydrate.

6. The decomposition treatment liquid for the cured unsaturated polyester resin according to claim 2, wherein the organic solvent includes an alcohol solvent.

7. The decomposition treatment liquid for the cured unsaturated polyester resin according to claim 2, wherein the organic solvent has a boiling point of 170° C. or higher.

8. The decomposition treatment liquid for the cured unsaturated polyester resin according to claim 2, wherein the organic solvent includes an alcohol solvent having a boiling point of 170° C. or higher.

9. A method for treating a cured unsaturated polyester resin, comprising a step of decomposing or dissolving the cured unsaturated polyester resin using the treatment liquid according to claim 2.

10. The method for treating the cured unsaturated polyester resin according to claim 9, wherein the resin is treated with a treatment liquid at 250° C. or lower.

11. The method for treating the cured unsaturated polyester resin according to claim 9, wherein the resin is treated under atmospheric pressure.

12. A method for separating the composite material containing a filler and a cured unsaturated polyester resin, wherein the composite material is separated into the tiller and a cured resin powder or a solution or decomposed product the cured resin by treating the cured resin with a treatment liquid for decomposition or dissolution, the treatment liquid containing a compound having a phosphoric acid structure or salt thereof and an organic solvent, wherein the compound having a phosphoric acid structure is present at an amount between 0.001 to 80% by weight relative to the organic solvent.

13. A method for separating the composite material containing a filler and a cured unsaturated polyester resin, wherein the composite material is separated into the filler and a cured resin powder or a solution of decomposed product of the cured resin by treating the cured resin with a treatment liquid for decomposition or dissolution, the treatment liquid containing a salt of a compound having a phosphoric acid structure and an organic solvent, wherein the compound having a phosphoric acid structure is present at an amount between 0.001 to 80% by weight relative to the organic solvent.

14. The method for separating the composite material according to claim 13, wherein the salt of a compound having a phosphoric acid structure has an alkali metal ion.

15. The method for separating the composite material according to claim 13, wherein the salt of a compound having a phosphoric acid structure includes a potassium phosphate.

16. The method for separating the composite material according to claim 13, wherein the salt of a compound having a phosphoric acid structure includes a potassium phosphate hydrate.

17. The method for separating the composite material according to claim 13, wherein the organic solvent includes an alcohol solvent.

18. The method for separating the composite material according to claim 13, wherein the organic solvent has a boiling point of 170° C. or higher.

19. The method for separating the composite material according to claim 13, wherein the organic solvent includes an alcohol having a boiling point of 170° C. or higher.

20. The method for separating the composite material according to claim 13, wherein the temperature of the treatment liquid is 250° C. or lower at the use of the treatment liquid.

21. The method for separating the composite material according to claim 13, wherein the treatment liquid is used under atmospheric pressure.

* * * * *

UNITED STATES PATENT AND TRADEMARK OFFICE
CERTIFICATE OF CORRECTION

PATENT NO. : 6,780,894 B2
DATED : August 24, 2004
INVENTOR(S) : K. Shibata et al.

It is certified that error appears in the above-identified patent and that said Letters Patent is hereby corrected as shown below:

Column 16,
Line 27, "tiller" should be -- filler --.
Line 28, "or" (second occurrence) should be -- of --.
Line 29, after "product" insert -- of --.

Signed and Sealed this

Tenth Day of May, 2005

JON W. DUDAS
*Director of the United States Patent and Trademark Office*